United States Patent [19]

Sebastopoli

[11] Patent Number: 5,741,969
[45] Date of Patent: Apr. 21, 1998

[54] UTILITY METER ASSEMBLY AND METHOD OF USE

[75] Inventor: Clement Vincent Sebastopoli, Bellmore, N.Y.

[73] Assignee: Brooklyn Union, Brooklyn, N.Y.

[21] Appl. No.: 783,515

[22] Filed: Jan. 14, 1997

[51] Int. Cl.⁶ .......................... G01F 15/14; B65D 33/34
[52] U.S. Cl. .................. 73/273; 383/5; 383/67; 383/84; 383/102; 137/15; 137/316
[58] Field of Search .................. 73/272 R, 273, 73/277, 201; 220/4.02, 484, 400; 285/18, 30; 383/5, 67, 84, 102; 137/15, 316, 315, 317

[56] References Cited

U.S. PATENT DOCUMENTS

| | | |
|---|---|---|
| 3,913,400 | 10/1975 | Floren .................. 73/273 |
| 4,327,760 | 5/1982 | Lancaster .................. 137/15 |
| 4,532,688 | 8/1985 | Dewberry .................. 29/402 |
| 4,582,220 | 4/1986 | Batting .................. 220/367 |
| 5,077,001 | 12/1991 | Makowka .................. 383/5 |
| 5,286,110 | 2/1994 | Benson et al. .................. 383/5 |
| 5,503,271 | 4/1996 | Lynch .................. 206/305 |

*Primary Examiner*—George M. Dombroske
*Assistant Examiner*—Harshad Patel
*Attorney, Agent, or Firm*—Fitzpatrick, Cella, Harper & Scinto

[57] ABSTRACT

A gas meter installation wherein a gas meter is contained within a protective bag during normal operation and wherein the bag may not be opened to obtain access to the meter without causing a permanent indication of such opening.

10 Claims, 1 Drawing Sheet

5,741,969

UTILITY METER ASSEMBLY AND METHOD OF USE

BACKGROUND OF THE INVENTION

1. Field of the Invention

This invention relates to the protection of utility meters and more particularly it concerns novel structure and methods for reducing the maintenance expenses associated with the replacement and refurbishing of utility meters. The term "utility meters" herein is to be understood as meaning any meter for measuring the flow of a fluid, including gas, water and electricity.

2. Description of the Related Art

Utility meters are used by public utility companies to measure the consumption of a resource, such as gas, water or electricity, by a consumer. The meter is connected into the line which supplies the resource at the premises of the consumer so that the fluid being consumed passes through the meter and its quantity is measured. This measurement is seen as a reading in a window on the face of the meter; and it is read periodically by a representative of the utility company. Based on this reading, the utility company prepares billing to the consumer.

From time to time it is necessary to disconnect the meter so that it can be cleaned, repainted and recalibrated. The disconnected meter is replaced with a new meter; and the disconnected meter is then taken to the utility company's facilities where it can be cleaned, repainted and recalibrated.

Gas meters are generally disconnected for cleaning, repainting and recalibration after approximately twenty five years of service. Because of this long duration of service, and because of the ambient conditions at the meter's installed location, a considerable amount of dirt, grime and corrosion accumulates on its housing; and it becomes very difficult to clean. The cleaning operation is highly labor intensive; and it must be carried out carefully so as not to damage the metering mechanism inside the meter housing.

U.S. Pat. No. 4,327,760 and No. 4,532,688 relate to arrangements for gas meter replacement without interruption of service. Specifically, according to these patents, a gas tight bag is placed over a meter which is to be removed from a customer's premises. A replacement meter is also positioned inside the bag. The bag is then sealed tightly to gas input and output lines near their connection to the meter; and the bag is tightly closed so that gas cannot leak out when the meter is disconnected. Thereafter, fittings which connect the meter to the gas input and output lines are manipulated through the bag; and the meter is disconnected from the lines. The replacement meter, which is already in the bag, is then attached to the gas input and out put lines; and the bag, with the original meter, is then removed.

U.S. Pat. No. 4,582,220 relates to a molded plastic cover for a gas meter. The cover has a window for reading the meter. U.S. Pat. No. 5,503,271 relates to a cover for enclosing and protecting an electric meter during transportation and storage. U.S. Pat. No. 5,286,110 relates to a flexible package having a tamper-resistant seal.

None of the foregoing patents is concerned with the problem of cleaning and refurbishing meters which have accumulated a large amount of grime and corrosion over a long period of time.

SUMMARY OF THE INVENTION

The present invention, in one aspect, involves a fluid meter installation which comprises a fluid meter connected to fluid input and output lines; and a cover which encloses the meter. The cover is transparent in a region over the meter indicators so that the meter can be read without need to remove it from the cover. The cover also has openings to permit circulation of air around, and drainage of condensation from, the meter. In addition, the enclosure has a large closeable opening through which the meter may be removed. This closeable opening is constructed such that it cannot be opened without producing a permanent indication of its having been opened.

In one embodiment, the closeable opening may be provided with a seal that must be broken in order to open the enclosure.

In another aspect, the invention involves a novel method of maintaining a fluid meter. This novel method includes the steps of placing the meter inside a protective cover which has a transparent area in registry with a readout from the meter, and which has openings to permit circulation of air around, and drainage of condensation from, the meter. Fluid inlet and outlet lines are inserted through openings in the enclosure and are connected to the meter within the enclosure. The enclosure is then closed in a manner such that the meter may not be removed without producing a permanent indication on said enclosure of such removal.

In a further aspect, the invention involves a novel method of maintaining a fluid metering facility. This novel method involves the steps of placing a meter in a protective enclosure, closing the enclosure in a manner such that the meter cannot be removed except by producing a permanent indication of such removal. Inlet and outlet lines are brought through openings in the enclosure and are connected to the meter. The meter, with its enclosure is thereafter removed from the facility. The enclosure is then opened; and the meter is removed for reconditioning. The meter is then placed in a new enclosure and is reconnected to fluid lines which extend through openings in the new enclosure.

In a yet further aspect the present invention involves a novel meter cover in the form of a flexible bag having a transparent region to allow the reading of a meter enclosed within the bag. The bag has air inlet openings to allow air to circulate inside the bag, and drain openings to allow drainage of condensate that forms within the bag. The bag has a further opening to allow a meter to be placed inside the bag. There is also provided a closure element which maintains the further opening closed. The closure element cannot be opened without causing a permanent indication that it has been opened.

DETAILED DESCRIPTION OF THE PREFERRED EMBODIMENT

Figure 1:
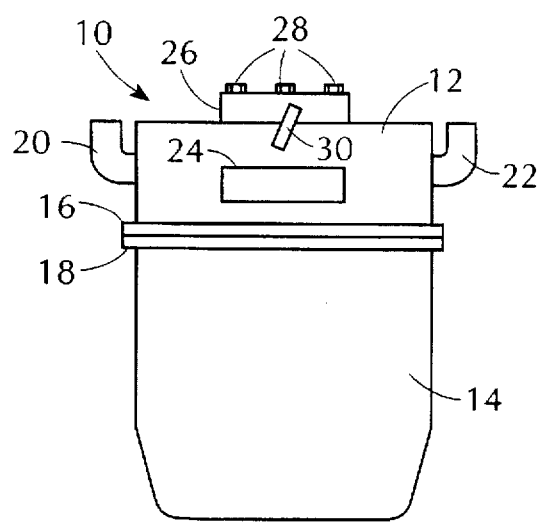
FIG. 1 is a front elevation view of a gas meter which may be used in the present invention.

As shown in FIG. 1, a gas meter 10 comprises upper and lower housings 12 and 14 which are held together by bolts (not shown) extending through peripheral flanges 16 and 18.

The upper housing is formed with inlet and outlet connection pipes 20 and 22 through which gas to be metered flows into and out from the meter 10. A gas flow measuring device (not shown) is located within the housings 12 and 14 and is actuated by the flow of gas into and out from the meter. The amount of this gas flow is recorded and is registered on dial or other visible indicator (also not shown). A window 24 on the upper housing permits one to read the indicator at any time during operation of the meter. A meter cover 26 is attached to the upper housing 12 by bolts 28. This cover may be removed to gain access to and make repairs on the gas flow measuring device. Only authorized persons are permitted to remove the cover 26; and to be sure that it has not been tampered with, a frangible seal 30 is placed across the cover 26 and the upper housing 12. This seal must be broken in order to remove the cover 26.

Figure 2:
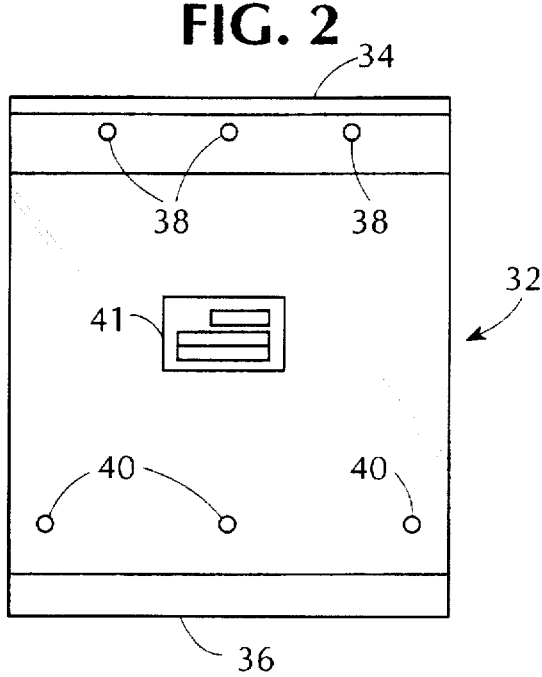
FIG. 2 is a front elevation view of a flexible bag which forms a cover according to the present invention.

Turning now to FIG. 2, there is shown a cover 32 in the form of a flexible bag. The bag 32 is shown in flattened condition in FIG. 2. This bag is preferably made of a static free, low density clear polyethylene plastic about 0.004 inches (1 millimeter) thick. The bag 32 is large enough to enclose the gas meter 10 of FIG. 1. Preferably the bag 32 is 18 inches centimeters) high and 17½ inches (44 centimeters) wide, which is sufficient to enclose a standard gas meter. The bag 32 is closed along its upper edge 34 and is initially open along the full length of its lower edge 36. Several upper vent holes 38 are provided near the upper edge 34 of the bag; and several drain holes 40 are provided near its lower edge 36. The vent holes 38 allow air to enter into the bag and to circulate around its interior; and the drain holes 40 allow condensate which may form in the interior of the bag to be drained away. Preferably the outer surface of the bag 32 is provided with a label area 41 which contains information relevant to the meter 10. Also, the label area may be constructed to permit writing thereon to provide additional information regarding installation date, etc. of the meter.

Figure 3:
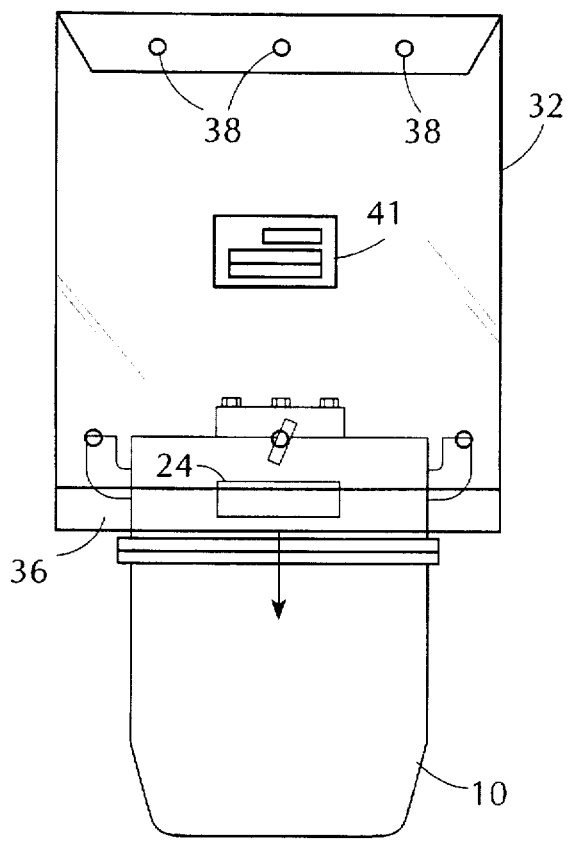
FIG. 3 is a front elevational view showing the insertion of the meter of FIG. 1 into the enclosure of FIG. 2.
Figure 4:
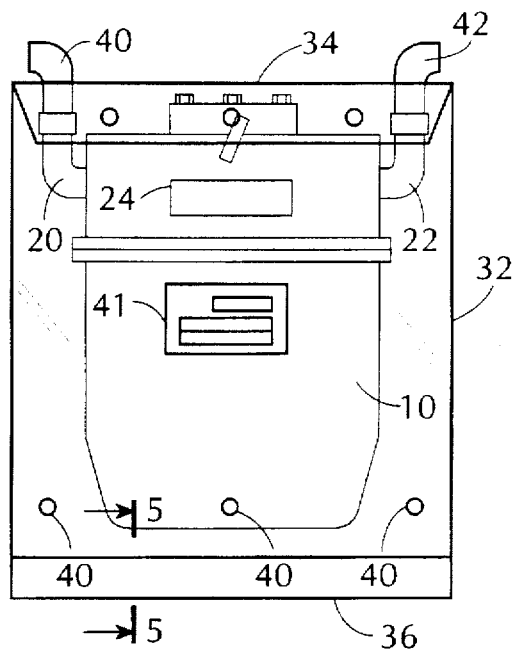
FIG. 4 is a front elevational view showing the meter fully enclosed within the cover.

As shown in FIG. 3, the bag 32 has a lower edge 36 which forms a large opening. The meter 10 is inserted into the bag 32 through this opening. This is preferably done at a meter reconditioning or supply facility. The lower edge 36 of the bag 32 is then closed and sealed; and the bag 32, with the meter 10 contained therein, is brought to the customer's premises. Then, as shown in FIG. 4, openings are made in the upper region of the bag; and gas flow lines 40 and 42 at the customer's premises are inserted into these openings. The inlet and outlet connection pipes 20 and 22 of the meter 10 are then coupled to the gas flow lines 40 and 42 to complete the meter installation.

The bag 32 is transparent and allows one to see the window 24 on the meter 10. This permits the utility company and the consumer to read the meter at all times while it is in use. It in not necessary that the entire bag 32 be transparent, provided that it is transparent in the region adjacent the meter window 24.

It will be appreciated that the meter 10 is protected by the bag 32. At the same time the vent holes 38 allow air to enter into the bag and to circulate around the meter while the drain holes 40 allow condensate to which may form on the meter housing to be drained away.

It will also be appreciated that in order to open the bag 32, it is necessary to break the seal along the lower edge. The seal is constructed such that it cannot be broken without providing a permanent indication that the bag 32 has been opened. This allows the utility company to know when there has been tampering with the meter 10.

Figure 5:
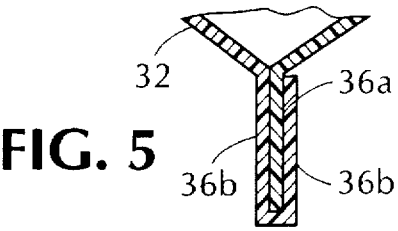
FIG. 5 is an enlarged section view taken along line 5—5 of FIG. 4.

The seal along the lower edge of the bag 32 may be of any construction that causes permanent indication of its having been broken. Preferably the seal is as shown in cross-section in FIG. 5. As can be seen, the bottom edge of the bag is formed with a forward flap 36a which extends along the lower edge 36, and a rearward flap 36b which also extends along the lower edge 36. The rearward flap 36b is longer than the forward flap 36a and it extends around the forward flap as shown in FIG. 5. A permanent self-peel adhesive with a peel strip (not shown) is placed along the flap 36b. After the meter 10 is placed in the bag 32, the bag is sealed by removing the peel strip and folding the elongated flap 36b around, and pressing it against, the front flap 36a so that it adheres to the front flap. The adhesive is such that it cannot be pulled away from the front flap 36a once it has been adhered to the flap. Thus, if one attempts to remove the meter 10 from the bag 32 by opening the seal along the lower edge 36, the bag cannot be resealed; and the seal cannot be opened without a permanent indication of its having been opened. Thus, the utility company will have an indication that the meter 10 has or my have been tampered with.

Other means which will provide a permanent indication of opening of the bottom of the bag 32 can be used, such as a tie strip which extends through holes in the bottom of the bag. The tie strip should be sealed in such a way that it must be broken in order to release it from the bag.

During the time that the meter 10 is operating, it is contained inside the enclosure or bag 32; and it is therefore protected by the bag from corrosion and accumulation of dirt, grime, etc. At the same time the meter may be read at periodic intervals. When the meter is due for reconditioning, it can be removed by a representative of the utility company and then taken out of the bag 32. Since the meter has been protected it may be cleaned and calibrated without difficulty. Thereafter, the meter 10 may be placed in a new bag 32 and reinstalled at the same or another consumer's facility.

I claim:

1. A fluid meter assembly comprising a fluid meter having fluid input and output conduits and a meter reading window, a cover enclosing the meter, said cover being transparent at least in the vicinity of said window, said cover having air inlet openings for admission of air to circulate around the meter, and drain openings to allow drainage of condensate that forms within the cover, said cover having a second opening through which said meter is removable from said cover, said second opening being closeable, and a closure element which maintains said second opening closed and which cannot be opened without causing a permanent indication that it has been opened.

2. A fluid meter assembly according to claim 1 wherein said cover is formed with third openings through which moisture within said cover is drainable.

3. A fluid meter assembly according to claim 1 wherein said cover is flexible.

4. A fluid meter assembly according to claim 3 wherein said cover is in the form of a bag.

5. A fluid meter assembly according to claim 1 wherein said cover is transparent.

6. A fluid meter assembly according to claim 1 wherein said closure element includes an adhesive seal along a bottom edge of said closure element.

7. A fluid meter assembly according to claim 1 wherein said closure element includes a flap which is adhesively sealed to the bottom of the cover.

8. A method of installing a fluid meter, said method comprising the steps of:

placing the meter inside a protective enclosure, said enclosure having a transparent area in registry with a readout from said meter, and having first openings to permit circulation of air around, and drainage of condensation from, said meter, inserting fluid inlet and outlet lines through a second and a third opening in said enclosure and connecting said lines to said meter within said enclosure, and closing said enclosure so that said meter can not be removed therefrom without producing a permanent indication on said enclosure of such removal.

9. A method of maintaining a fluid meter said method comprising the steps of placing a fluid meter in a protective enclosure, said enclosure having openings through which fluid inlet and fluid outlet lines can be inserted;

closing said enclosure in a manner such that said meter cannot be removed therefrom except by producing a permanent indication of such removal, inserting fluid inlet and outlet lines through said openings in said enclosure and connecting said lines to said meter, thereafter, disconnecting said lines from said meter and removing said meter with said enclosure from said facility, for the purpose of reconditioning removing the meter from the enclosure and reconditioning the meter, placing the reconditioned meter in a new enclosure, said new enclosure also having openings through which fluid inlet and fluid outlet lines can be inserted; and reconnecting the meter to fluid lines which extend through said openings in the new enclosure.

10. A fluid meter enclosure comprising a flexible bag having a transparent region to allow the reading of a meter contained therein, said bag having air inlet openings for admission of air to circulate therein, and drain openings to allow drainage of condensate that forms within the bag, said bag having a further opening through which a meter can be placed into the bag, said further opening being closeable, and a closure element which maintains said further opening closed and which cannot be opened without causing a permanent indication that it has been opened.

* * * * *

UNITED STATES PATENT AND TRADEMARK OFFICE
CERTIFICATE OF CORRECTION

PATENT NO. : 5,741,969
DATED : April 21, 1998
INVENTOR(S) : CLEMENT V. SEBASTOPOLI It is certified that error appears in the above-identified patent and that said Letters Patent is hereby corrected as shown below:

ABSTRACT

Line 3, "may" should read --can--.

COLUMN 1

Line 51, "out put" should read --output--.

COLUMN 2

Line 32, "meter," should read --meter--.

Line 51, "may" should read --can--.

COLUMN 3

Line 22, "centimeters)" (first occurrence) should read --(46 centimeters)--.

Line 51, "It in" should read --It is--.

Line 57, "to which" should read --which--.

UNITED STATES PATENT AND TRADEMARK OFFICE
CERTIFICATE OF CORRECTION

PATENT NO. : 5,741,969
DATED : April 21, 1998
INVENTOR(S) : CLEMENT V. SEBASTOPOLI It is certified that error appears in the above-identified patent and that said Letters Patent is hereby corrected as shown below:

COLUMN 4

Line 19, "my have" should read --may have--.

COLUMN 5

Line 14, "meter" should read --meter,--.

Signed and Sealed this

Fifteenth Day of September, 1998

Attest:

BRUCE LEHMAN

Attesting Officer    Commissioner of Patents and Trademarks